United States Patent [19]
Wolens

[11] 3,756,139
[45] Sept. 4, 1973

[54] POPCORN POPPER
[76] Inventor: John Wolens, 893 Dean Ave., Highland Park, Ill.
[22] Filed: Apr. 12, 1972
[21] Appl. No.: 243,321

[52] U.S. Cl. .............................................. 99/323.5
[51] Int. Cl. ............................................... A23l 1/18
[58] Field of Search ...................... 99/323.5, 323.8, 99/323.9, 323.11, 323.4, 323.6, 323.7, 81

[56] References Cited
UNITED STATES PATENTS
| | | | |
|---|---|---|---|
| 1,206,693 | 11/1916 | Gillitt | 99/323.11 |
| 2,602,134 | 7/1952 | Nelson | 99/323.5 |
| 2,922,355 | 1/1960 | Green | 99/323.11 |
| 3,059,567 | 10/1962 | Lindemann | 99/323.11 |
| 3,570,388 | 3/1971 | Gottlieb | 99/323.5 |

Primary Examiner—Robert W. Jenkins
Attorney—Charles E. Quarton

[57] ABSTRACT

A device for popping corn having a receptacle for receiving popped corn and a popping vessel arranged in the receptacle for receiving kernels of popcorn. A hot air blower charges a stream of hot air downward into the popping vessel and heats kernels of popcorn to a popping temperature. The stream of air drives the popped corn out of the popping vessel and into the receptacle to separate the popped corn from the unpopped kernels of pop corn.

6 Claims, 2 Drawing Figures

PATENTED SEP 4 1973　　　　　　　　　　　3,756,139
FIG. 1
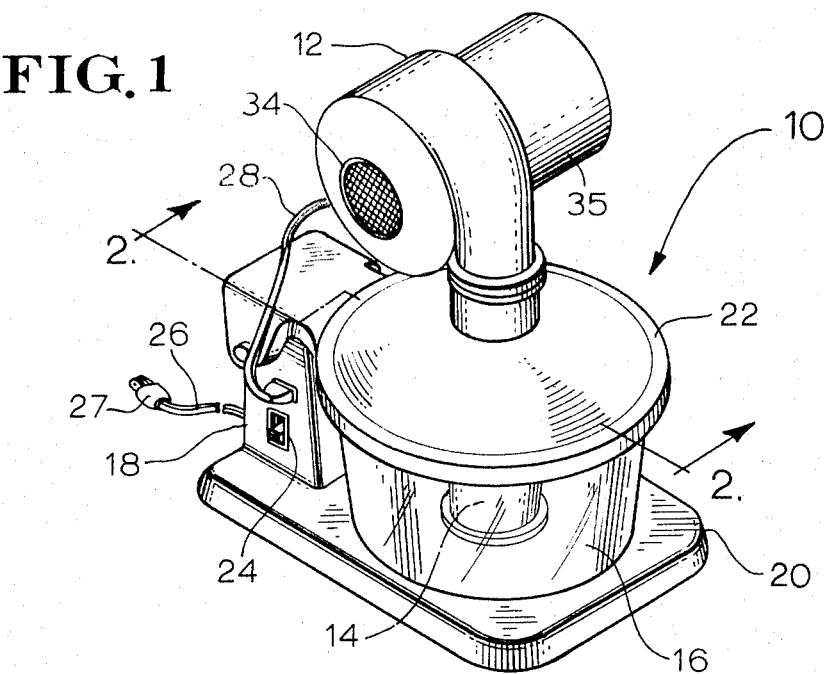
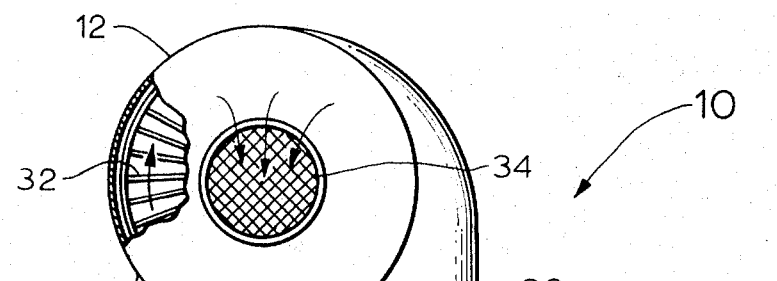
FIG. 2

POPCORN POPPER

The invention relates to a device for popping kernels of popcorn. More particularly, the invention relates to a device for popping kernels of popcorn which utilizes a stream of hot air for heating the kernels of popcorn to popping temperature.

The kernels of popcorn to be popped are contained in a popping vessel which is arranged in a receptacle that is utilized for receiving the popped corn. Means is utilized for charging a stream of hot air into the popping vessel to heat the kernels of popcorn to be popped to popping temperature. The stream of hot air also blows popped corn out of the popping vessel and into the receptacle, thereby separating the popped corn from the unpopped kernels of popcorn.

Typically, not all of the kernels of popcorn to be popped will pop, even though the kernels are raised to popping temperature. This results from faulty kernels of popcorn and also from kernels having an insufficient moisture content for popping. The stream of hot air in the present invention functions to heat the kernels to popping temperature and also to separate the popped corn from the unpopped kernels. After the popping operation has ceased, those kernels of corn which will not pop remain in the popping vessel and are not mixed with the popped corn in the receptacle.

Thus, the popped corn can be served in the receptacle and the unpopped kernels of corn will remain separated from the popped corn or the unpopped kernels can be removed before serving by simply removing the popping vessel from the receptacle. A higher quality of popcorn can therefore be served since the unpopped kernels of corn are not mixed in with the popped corn.

In the present invention, the popping operation proceeds without the necessity of mixing oil with the kernels of popped corn as is typically done when heat is applied to kernels of popped corn. If an oil is used with the kernels of popcorn, in the popping operation, care must be taken to select an oil which will not burn at popping temperature. For example, butter will burn at a temperature lower than the approximately 500° F popping temperature. Thus, the elimination of the use of oil in the popping operation eliminates the possibility of inadvertently using an oil which will burn as the popping process occurrs.

These and other aspects of the invention are considered in detail in the detailed description and the drawings which demonstrate one form of the invention, in which drawings:

FIG. 1 is a perspective view of a corn popper embodying the present invention; and FIG. 2 is a sectional view taken along line 2—2 of FIG. 1.

Referring to the drawings, a corn popper indicated generally by the numeral 10 and embodying the present invention includes a blower assembly 12 for charging a stream of hot air into a popping vessel 14. The popping vessel 14 is arranged within a receptacle 16 and is used to receive kernels of popcorn which are to be popped. The stream of hot air from the blower assembly 12 impinges on the kernels of popcorn, thereby heating the kernels to popping temperature, and travels on up the sides of the popping vessel 14. As the popping of the kernels takes place, the stream of hot air passing up the sides of the popping vessel 14 carries the popped corn out of the popping vessel 14 and into the receptacle 16.

Referring to FIG. 1, the corn popper 10 includes a housing 18 having a platform 20 for receiving the receptacle 16. The housing 18 houses a control switch 24 and provides support for a cover 22 which carries the blower assembly 12. The control switch 24 is electrically coupled to a source of electrical power by electrical power line 26 and is also electrically coupled to an electric cord 28. The power line 26 has a male plug 27 for connection to a wall outlet of a conventional type. The electric cord 28 couples the control switch 24 to the blower assembly 12 and thereby supplies electric power to the blower assembly, when the control switch 24 is turned on. Preferably, the electric cord 28 is removably connected to the housing 18, as illustrated in the drawings, in order that the cover 22 and associated blower assembly 12 can be readily removed from the housing 18.

Referring to FIG. 2, the blower assembly 12 is coupled through an aperture in the cover 22 to permit discharge of air from the blower assembly into the popping vessel 14. The cover 22 supports the blower assembly 12 and is connected to the housing 18 by a hinge pin 30. The hinged connection with the housing 18 provided by the hinge pin 30 permits the cover 22 and associated blower assembly 12 to be pivoted away from the receptacle 16 and thereby permit removal of the receptacle. While the blower assembly 12 is illustrated as being supported by the cover 22, other means for supporting the blower assembly in relation to the popping vessel 14 can be utilized in practicing the present invention. The cover 22 has a plurality of spacing beads 30 which contact the receptacle 16. The air gap between adjacent ones of the beads 30 serves as a venting means to permit air discharging from the blower assembly 12 into the popping vessel 14 to escape from the receptacle 16. However, structure other than the beads 30 can be utilized to provide means for venting the stream of hot air discharged from the blower assembly 12.

The blower assembly 12 includes an impeller 32 which receives air from an inlet 34. The impeller 32 is rotated by an electric motor 35 and generates a flow of air which passes over a heating element 36. The heating element 36 heats the air and a hot air stream is discharged from the blower assembly 12 into the popping vessel 14. The pressure of the air stream from the blower assembly 12 is insufficient to blow the kernels of popcorn out of the popping vessel 14 and into the receptacle 16. However, due to the larger surface area of the popped corn on which the pressure of the air stream acts, the air stream blows the popped corn out of the popping vessel 14 and into the receptacle 16.

The receptacle 16 is utilized as a container for the popped corn during the popping process and can also be utilized for serving the popped corn after the popping process is complete. It will be appreciated that the capacity of the receptacle 16 can be varied to provide different sizes of corn poppers to meet the requirements of a given application of the invention. Preferably, the receptacle 16 is formed of a transparent or translucent material so that the popping action can be viewed during the popping process.

The receptacle 16 has an aligning ridge 38 which extends upward and is located on the interior of the receptacle bottom. The aligning ridge 38 conforms to the contour of the bottom of the popping vessel 14 and is preferably annular in shape. The aligning ridge 38 serves to align the popping vessel 14 with the receptacle 16 and consequently with the stream of air which is discharged from the blower assembly 12. Thus, the aligning ridge 38 serves as a means for aligning the popping vessel with respect to the receptacle 16. However, it is apparent that other structures could be utilized for aligning the popping vessel 14 with respect to the receptacle 16. The receptacle 16 also includes an annular indexing ridge 40 which extends downward and is located on the exterior of the receptacle bottom and engages a recessed portion 42 in the platform 20. The indexing ridge 40 and the recessed portion 42 operate to index the receptacle 16 with respect to the blower assembly 12 so that the stream of air discharging from the blower assembly is charged into the popping vessel 14. It is further apparent that other structures could be utilized for indexing the receptacle 16 with respect to the blower assembly 12.

In the operation of the corn popper 10, kernels of popcorn are placed in the popping vessel 14 and the control switch 24 is turned on to supply electric power to the blower assembly 12. The blower assembly 12 then generates a stream of hot air which is charged into the popping vessel 14. The stream of hot air from the blower assembly 12 impinges on the popcorn in the popping vessel 14, travels upward along the sides of the popping vessel 14 and vents through the air gaps between adjacent ones of the spacing beads 30 on the cover 22. The stream of hot air impinging on the kernels of popcorn raises the uppermost kernels in the popping vessel 14 to popping temperature and causes popping to begin. The popped corn is carried upward by the air stream generated by the blower assembly 12, out of the popping vessel 14 and into the receptacle 16. The cover 22 prevents popped corn from escaping from the receptacle 16 and directs popped corn into the receptacle. Thus, the hot air stream from the blower assembly 12 operates to heat the kernels of popcorn to popping temperature and to separate the popped corn from the unpopped kernels of corn.

When the popping operation has ceased, the popped corn is contained in the receptacle 16 and the unpopped kernels of corn which will not pop remain in the popping vessel 14. The cover 22 can then be pivoted away from the receptacle 16 and the receptacle can be removed from the corn popper 10. The receptacle 16 can be utilized as a serving bowl for the popped corn. If desired, the popping vessel 14 can be removed from the receptacle 16 before serving and the unpopped kernels of corn in the popping vessel can be discarded.

If desired, a baffle (not shown) may be positioned over a portion of the top of the popping vessel 14 to assure that no kernels of unpopped corn fall into the receptacle 16. The baffle would be arranged over the popping vessel 14 at an angle with respect to the top of the popping vessel and have apertures for passing the stream of air from the blower assembly 12 into the popping vessel. Any kernels of unpopped corn which may, at random, leave the popping vessel 14 would tend to travel directly upward in a straight path, thereby striking the baffle and returning to the popping vessel 14. However, popped corn would tend to travel up the sides of the popping vessel 14 and into the receptacle 16 without striking the baffle.

It is to be understood that various modifications can be made to the disclosed corn popper without departing from the scope of the invention and it is intended to cover in the appended claims all such modifications as fall within the true spirit and scope of the invention.

What is claimed is:

1. A device for popping kernels of popcorn comprising:
    a receptacle for receiving corn which has been popped;
    a popping vessel for receiving kernels of popcorn to be popped, said vessel being arranged within said receptacle; and
    means for charging a stream of hot air vertically downward into said popping vessel, said stream of hot air heating kernels of popcorn to be popped in said popping vessel to popping temperature and directing corn which has been popped upward out of said popping vessel into said receptacle.

2. The device of claim 1 wherein said receptacle includes means for aligning said popping vessel with respect to said receptacle.

3. The device of claim 2 further including means for indexing said receptacle with respect to said charging means thereby positioning said charging means with respect to said popping vessel and said receptacle.

4. The device of claim 1 further including means for covering said receptacle to prevent popped corn from said popping vessel from passing outside said receptacle, said covering means being vented with respect to said receptacle to permit escape of air from said charging means.

5. The device of claim 4 wherein said charging means includes a blower assembly for generating a flow of air, and means for heating said flow of air generated by said blower assembly.

6. The device of claim 5 wherein said charging means is supported by said covering means in a position above said receptacle and said popping vessel.

* * * * *